US010667207B2

(12) United States Patent
Chang et al.

(10) Patent No.: US 10,667,207 B2
(45) Date of Patent: May 26, 2020

(54) ACCESS POINT ASSISTED ROAMING

(71) Applicant: Microsoft Technology Licensing, LLC, Redmond, WA (US)

(72) Inventors: Chih-Chung Chang, Redmond, WA (US); Yatharth Gupta, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/519,870

(22) Filed: Oct. 21, 2014

(65) Prior Publication Data

US 2016/0112942 A1 Apr. 21, 2016

(51) Int. Cl.
*H04W 48/20* (2009.01)
*H04W 24/10* (2009.01)
(Continued)

(52) U.S. Cl.
CPC .......... *H04W 48/20* (2013.01); *H04B 7/0413* (2013.01); *H04B 7/0417* (2013.01);
(Continued)

(58) Field of Classification Search
CPC ............. H04W 36/08; H04W 36/0061; H04W 36/0083; H04W 24/02; H04W 36/00835;
(Continued)

(56) References Cited

U.S. PATENT DOCUMENTS 6,332,077 B1    12/2001   Wu et al.
7,203,598 B1 *   4/2007   Whitsell ................. G01C 21/26
                                                         340/988
(Continued)

FOREIGN PATENT DOCUMENTS

CN         101253730 A       8/2008
WO     WO 2007145625 A1 *  12/2007   ......... G01C 21/3484

OTHER PUBLICATIONS

"Configuring Assisted Roaming", Retrieved From: <http://www.cisco.com/c/en/us/td/docs/wireless/controller/7-4/configuration/guides/consolidated/b_cg74_CONSOLIDATED/b_cg74_CONSOLIDATED_chapter_01100111.html> Aug. 19, 2014, Jan. 8, 2013, 4 Pages.

(Continued)

*Primary Examiner* — Fred A Casca
(74) *Attorney, Agent, or Firm* — Newport IP, LLC; Mike R. Cicero

(57) ABSTRACT

In embodiments of access point assisted roaming, a mobile device, such as a mobile phone, tablet computer, or other portable device is implemented for wireless connection with access points, such as Wi-Fi access points. An access point controller can receive a request for a neighbor report from the mobile device, and also obtain a travel direction of the mobile device. The access point controller is implemented to determine access points that are each configured for a wireless connection with a communication system of the mobile device, where a wireless connection with an access point is based in part on a detected signal strength of an access point. The access point controller can then generate the neighbor report that lists one or more of the access points in order of connection likelihood and based on the travel direction of the mobile device.

20 Claims, 5 Drawing Sheets

(51) Int. Cl.

| | |
|---|---|
| *H04B 7/0417* | (2017.01) |
| *H04L 1/04* | (2006.01) |
| *H04B 7/0413* | (2017.01) |
| *H04W 16/24* | (2009.01) |
| *H04W 16/28* | (2009.01) |
| *H04W 36/00* | (2009.01) |
| *H04W 88/08* | (2009.01) |
| *B64C 39/02* | (2006.01) |
| *H04W 36/32* | (2009.01) |
| *H04W 36/24* | (2009.01) |
| *H04W 84/12* | (2009.01) |

(52) U.S. Cl.
CPC ............ *H04B 7/0421* (2013.01); *H04L 1/04* (2013.01); *H04W 16/24* (2013.01); *H04W 16/28* (2013.01); *H04W 24/10* (2013.01); *H04W 36/00835* (2018.08); *B64C 39/024* (2013.01); *H04W 36/245* (2013.01); *H04W 36/32* (2013.01); *H04W 84/12* (2013.01); *H04W 88/08* (2013.01)

(58) Field of Classification Search
CPC ............ H04W 36/0055; H04W 36/32; H04W 36/0094; H04W 48/20; H04W 36/00; H04W 36/0085
USPC ......... 370/252, 331, 332; 701/451; 455/437, 455/439
See application file for complete search history.

(56) References Cited

U.S. PATENT DOCUMENTS

| | | | |
|---|---|---|---|
| 7,421,268 B2 | 9/2008 | Lee et al. | |
| 7,912,032 B2 | 3/2011 | Zeng | |
| 7,944,886 B2 | 5/2011 | Stephenson et al. | |
| 8,755,353 B2 | 6/2014 | Lu | |
| 8,825,407 B2* | 9/2014 | Brennan | G06Q 10/06 701/540 |
| 8,948,779 B1* | 2/2015 | Choi | H04L 67/303 455/456.1 |
| 2004/0039817 A1 | 2/2004 | Lee | |
| 2007/0076671 A1 | 4/2007 | Winget et al. | |
| 2007/0142050 A1 | 6/2007 | Handforth et al. | |
| 2010/0241854 A1 | 9/2010 | Yao et al. | |
| 2012/0239291 A1* | 9/2012 | Do | G01S 5/0236 701/451 |
| 2014/0098682 A1* | 4/2014 | Cao | H04W 36/0083 370/252 |
| 2014/0303839 A1* | 10/2014 | Filev | G06F 3/0481 701/36 |

OTHER PUBLICATIONS

"Real-time Traffic over WLAN Roaming", Retrieved From: <http://www.cisco.com/c/en/us/td/docs/solutions/Enterprise/Mobility/RToWLAN/CCVP_BK_R7805F20_00_rtowlan-srnd/CCVP_BK_R7805F20_00_rtowlan-srnd_chapter_0101.html> Aug. 19, 2014, 20 Pages.

Mishra, et al.,' "Context Caching using Neighbor Graphs for Fast Handoffs in a Wireless Network", In Proceedings of 23rd AnnualJoint Conference of the IEEE Computer and Communications Societies, Mar. 7, 2004, 11 Pages.

Nagy, "Apple iOS Fast Roaming with Aerohive Wi-Fi APs", Retrieved From: <http://www.revolutionwifi.net/2013/05/apple-ios-fast-roaming-with-aerohive-wi.html> Aug. 19, 2014, May 31, 2013, 9 pages.

Nagy, "Wi-Fi Roaming Analysis Part 1—Connection Control", Retrieved From: <http://www.revolutionwifi.net/2011/12/wi-fi-roaming-analysis-part-1.html> Aug. 19, 2014, Dec. 19, 2011, 6 Pages.

"International Search Report and Written Opinion", Application No. PCT/US2015/055617, dated Jan. 14, 2016, 13 Pages.

"International Preliminary Report on Patentability Issued in PCT Application No. PCT/US2015/055617", dated Oct. 4, 2016, 9 Pages.

"Office Action Issued in European Patent Application No. 15787113.8", dated Feb. 14, 2019, 10 Pages.

"First Office Action and Search Report Issued in Chinese Patent Application No. 201580057421.0", dated Aug. 14, 2019, 18 Pages.

"Office Action Issued in European Patent Application No. 15787113.8", dated Dec. 10, 2019, 13 Pages.

"Second Office Action Issued in Chinese Patent Application No. 201580057421.0", dated Nov. 29, 2019, 8 Pages.

* cited by examiner

ACCESS POINT ASSISTED ROAMING

BACKGROUND

Portable electronic and computing devices, such as mobile phones, tablet computers, multimedia devices, and the like often include multiple, different systems for wireless communications, such as Wi-Fi, Bluetooth™, and Mobile Broadband. Further, mobile client devices are increasingly accessing Wi-Fi for many real-time communications and data streaming purposes. Current techniques utilize a wireless system infrastructure to assist devices when roaming by suggesting neighboring access points that are within range to establish a wireless connection. An access point controller of a wireless system infrastructure can generate a neighbor report for a roaming mobile device, and the neighbor report is typically generated based on proprietary logic implemented by an access point manufacturer and provider. A neighbor report is generated based on proximity of nearby access points, as well as detection of the access points by the access point that is currently associated with a mobile device. The nearby access points can also be prioritized in the neighbor report according to the signal strength (RSSI) of each of the nearby access points as detected by the access point that is currently associated with the mobile device.

SUMMARY

This Summary introduces features and concepts of access point assisted roaming, which is further described below in the Detailed Description and/or shown in the Figures. This Summary should not be considered to describe essential features of the claimed subject matter, nor used to determine or limit the scope of the claimed subject matter.

Access point assisted roaming is described. In embodiments, a mobile device, such as a mobile phone, tablet computer, or other portable device is implemented for wireless connection with access points, such as Wi-Fi access points. An access point controller can receive a request for a neighbor report from the mobile device, and also obtain a travel direction of the mobile device. The access point controller is implemented to determine access points that are each configured for a wireless connection with a communication system of the mobile device, where a wireless connection with an access point is based in part on a detected signal strength of an access point. The access point controller can then generate the neighbor report that lists one or more of the access points in order of connection likelihood and based on the travel direction of the mobile device.

In embodiments, routes of the mobile device are projected for the travel direction of the mobile device where each of the routes have an associated percentage that indicates a likelihood of the mobile device traveling along a particular route. Optionally, the routes of the mobile device are also projected based on a time of the day. The access point controller can then generate the neighbor report based on the travel direction of the mobile device and based on the projected routes for the mobile device in the travel direction. A likely route of the mobile device in the travel direction can also be determined based on the projected routes and the percentage that is associated with each of the projected routes.

In implementations, the mobile device may determine the direction of travel utilizing a positioning system of the mobile device, and the access point controller receives the travel direction of the mobile device along with the request for the neighbor report from the mobile device. Alternatively, the access point controller can obtain the travel direction of the mobile device by determining the travel direction based on differentials of triangulation positioning, as determined from the access points that are within communication range of the mobile device. Alternatively or in addition, the access point controller can obtain the travel direction of the mobile device based on previous associations of the mobile device with the access points.

BRIEF DESCRIPTION OF THE DRAWINGS

Embodiments of access point assisted roaming are described with reference to the following Figures. The same numbers may be used throughout to reference like features and components that are shown in the Figures.

DETAILED DESCRIPTION

Embodiments of access point assisted roaming are described and can be implemented to decrease the roaming time needed for a mobile device to transition a wireless connection from one access point to another. A mobile device, such as a mobile phone, tablet computer, or other portable device can include wireless communication systems for wireless communications, such as Wi-Fi, Bluetooth™ and Mobile Broadband. The roaming time for a mobile device can be reduced with a timely indication of a device heading (e.g., a device travel direction) and based on previous device associations and client roaming history patterns to predict client behavior. With mobile client devices increasingly accessing Wi-Fi for many real-time communications and data streaming purposes, the faster that a roaming wireless connection can occur, the better the end user experience.

An access point controller can generate a neighbor report for a requesting mobile device, and the neighbor report includes a list of access points in a prioritized order of connection likelihood. By taking into account device heading to prioritize the possible access point connections in a neighbor report, a mobile device will spend less time scanning for target access points when roaming from one access point to the next. This improves Wi-Fi roaming performance by reducing the time spent off-channel scanning for access points. When generating a neighbor report, the access point controller can eliminate those access points that may have a high RSSI (received signal strength indication), but are in the opposite heading or travel direction of the mobile device. With fewer access point suggestions in the neighbor report, the mobile device can save time and battery power by scanning less channels when making a roaming decision.

While features and concepts of access point assisted roaming can be implemented in any number of different devices, systems, networks, environments, and/or configurations, embodiments of access point assisted roaming are described in the context of the following example devices, systems, and methods.

Figure 1:
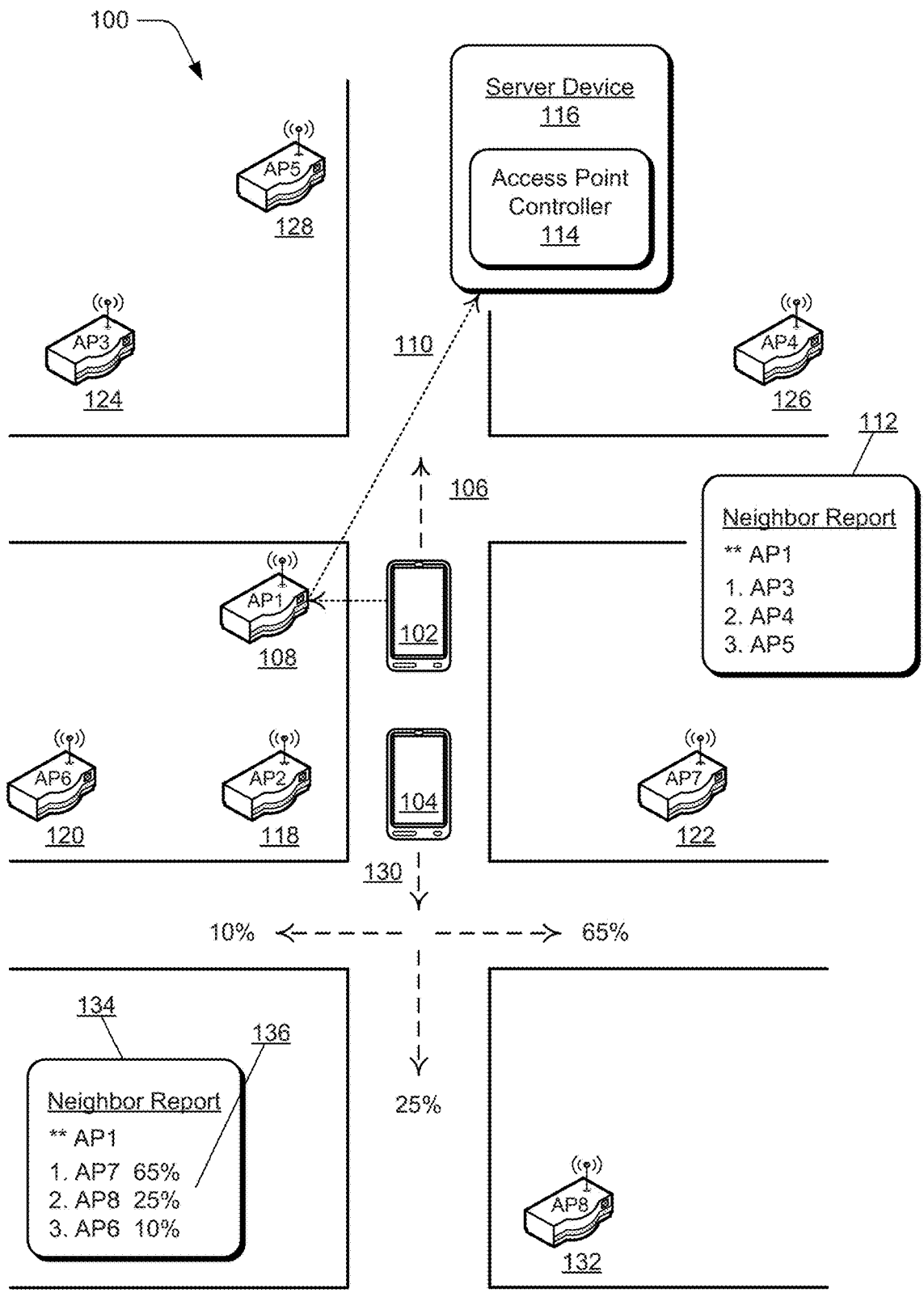
FIG. 1 illustrates examples of access point assisted roaming in accordance with one or more embodiments.

FIG. 1 illustrates examples 100 of access point assisted roaming, such as in a building or in any other environment set-up as an enterprise deployment with multiple access points that are implemented for wireless connection with mobile devices, such as a mobile device 102 and a mobile phone 104. The examples 100 illustrate that a user of the mobile device 102 may be walking in a building and generally moving in a travel direction 106. The mobile device 102 may currently be communicatively-linked to a first access point (AP1) 108, and as the device moves with the user, the mobile device 102 roams from one access point to another to maintain a WiFi connection.

As the mobile device 102 roams from the first access point (AP1) 108 to another access point that is in proximity for wireless communication, the mobile device 102 initiates a request 110 for a neighbor report 112 that will identify one or more access points that the mobile device 102 can then initiate a wireless connection. In this example, the mobile device 102 is communicatively-linked to the first access point (AP1) 108 and the request 110 for the neighbor report is routed via the access point (AP1) 108 to an access point controller 114 that manages the overall wireless communication system of access points for wireless connection decisions in the building or other environment. A server device 116 (which may also be configured as an access point) can implement the access point controller 114 that receives the request 110 for the neighbor report 112 from the mobile device 102.

In embodiments, the access point controller 114 can obtain the travel direction 106 of the mobile device 102, as well as the speed of travel, and generate the neighbor report 112 that lists one or more of the access points in order of connection likelihood and based on the travel direction 106 of the mobile device. The access point controller 114 can obtain the travel direction 106 of the mobile device 102 based on differentials of triangulation positioning, as determined from other access points that are within communication range of the mobile device. The access point controller 114 can utilize the network of access points to triangulate the Wi-Fi signal transmitted from the mobile device with heading information, and the travel direction 106 of the device can be derived from location triangulation data at set intervals.

Alternatively, the mobile device 102 may determine the travel direction 106 itself, such as with a positioning system of the mobile device, and then communicate the travel direction 106 and/or speed of travel to the access point controller 114. The access point controller can receive an indication of the travel direction 106 along with the request 110 for the neighbor report 112 from the mobile device 102. The access point controller 114 can also maintain a record of previous device associations, such as the previous access point associations and client roaming history patterns in the wireless communication system for the mobile device 102. The access point controller 114 can then obtain or determine the travel direction 106 of the mobile device 102 based on any combination of the previous device associations of the mobile device, an indication of the travel direction 106 from a positioning system of the mobile device, and/or based on the location triangulation data.

The access point controller 114 is implemented to determine access points for wireless connection with the mobile device 102 based on proximity of the mobile device 102 to the access points, taking into account the received signal strength indication (RSSI) of the access points as perceived from the currently associated access point (AP1) 108, and based on the travel direction 106 of the mobile device. The access point controller 114 can then generate the neighbor report 112 that lists the available access points in order of connection likelihood and the access point controller 114 can optimize the neighbor report 112 based on the travel direction 106 of the mobile device. When generating the neighbor report 112, the access point controller 114 can eliminate those access points that may have a high RSSI, but are in the opposite heading or travel direction 106 of the mobile device 102. By having less access point suggestions in the neighbor report 112, the mobile device 102 can save time and battery power by scanning less channels when making a roaming decision to maintain a Wi-Fi wireless connection. This technique improves the handover timing and accuracy for mobile devices roaming in Wi-Fi networks that are implemented with a centralized access point controller.

In the illustrated example, a conventional neighbor report for the mobile device 102 (currently associated with access point (AP1) 108) would list the next best access points based on proximity in any direction from the mobile device, such as access point (AP2) 118, access point (AP6) 120, access point (AP7) 122, and then access point (AP3) 124. The access point (AP2) 118 would be identified as the best access point for the mobile device 102 to roam to and establish a wireless connection based on proximity and the likely RSSI level. However, this does not take into account the travel direction 106 of the mobile device 102, and the access point (AP2) 118 is in the opposite direction of the device heading, and does not represent the best roaming choice for the mobile device.

With the addition of the heading information (e.g., the travel direction 106), the access point controller 114 can determine that the mobile device is moving away from the access point (AP2) 118, which is not included in the neighbor report 112. Rather, the access point controller 114 generates the neighbor report 112 that lists the access points prioritized based on connection likelihood and based on the travel direction 106 of the mobile device 102. In this example, the access points are listed as access point (AP3) 124, access point (AP4) 126, and access point (AP5) 128 as the target access points that the mobile device 102 is moving towards in the travel direction 106 and can initiate a roaming wireless connection with one of the access points. Further, the access point controller 114 may designate in the neighbor report 112 which particular access point that the mobile device 102 should connect with to establish a wireless connection.

In embodiments, the access point controller 114 may also project possible device routes of the mobile device 102 for the current travel direction 106 of the mobile device, and can also determine a likely device route of the mobile device based on the projected device routes in the travel direction. The access point controller 114 can utilize the previous access point associations and client roaming history patterns to project the possible device routes and determine a likely device route based on the current travel direction 106. Further, the possible and/or likely device routes can be determined based on a time of day. For example, the user of the mobile device 102 may typically turn left at the hallway and proceed to his office, which is nearby the access point (AP3) 124. However, during the lunch hour, the user of the mobile device may typically proceed straight in the travel direction 106 to a cafeteria in the building, which is nearby the access point (AP5) 128.

The access point controller 114 may determine the possible routes of the mobile device 102, as straight continuing the travel direction 106) towards access point (AP5) 128, or a device route to the left toward access point (AP3) 124. At around ten o'clock in the morning or three o'clock in the afternoon, the access point controller 114 may determine that the likely device route will be down the hallway to the left toward the access point (AP3) 124, which is likely if the user of the mobile device 102 is going to his office. Alternatively, around the lunch hour, the access point controller 114 may determine that the likely device route will be straight to the cafeteria toward the access point (AP5) 128, which is likely at that time if the user is going to lunch. The access point controller 114 can generate the neighbor report 112 to prioritize the access point in the direction of the likely device route, followed by the list of access points in the directions of projected device routes.

The examples 100 further illustrate that a user of a mobile phone 104 walking in the building (e.g., within the infrastructure of the wireless communication system) may be approaching an intersection of hallways when moving in the travel direction 130, and multiple device routes can be projected based on the various heading possibilities for the mobile phone. For example, access point controller 114 determines a 10% probability that the mobile phone 104 will travel towards the access point (AP6) 120, a 65% probability that the mobile phone 104 will travel in the opposite direction towards the access point (AP7) 122, or a 25% probability that the mobile phone 104 will continue along the travel direction 130 towards an access point (AP8) 132.

The access point controller 114 can utilize the previous access point associations and client roaming history patterns to project the possible device routes based on likelihood percentages that the mobile phone will travel along any one of the possible projected device routes. The access point controller 114 can then generate a neighbor report 134 for the mobile phone 104 that lists the access points in order of connection likelihood and in a prioritized order based on the device routes that have the highest probability of occurring. There each of the access points have an associated percentage 136 that indicates a likelihood of the mobile phone traveling along a particular route.

Figure 2:
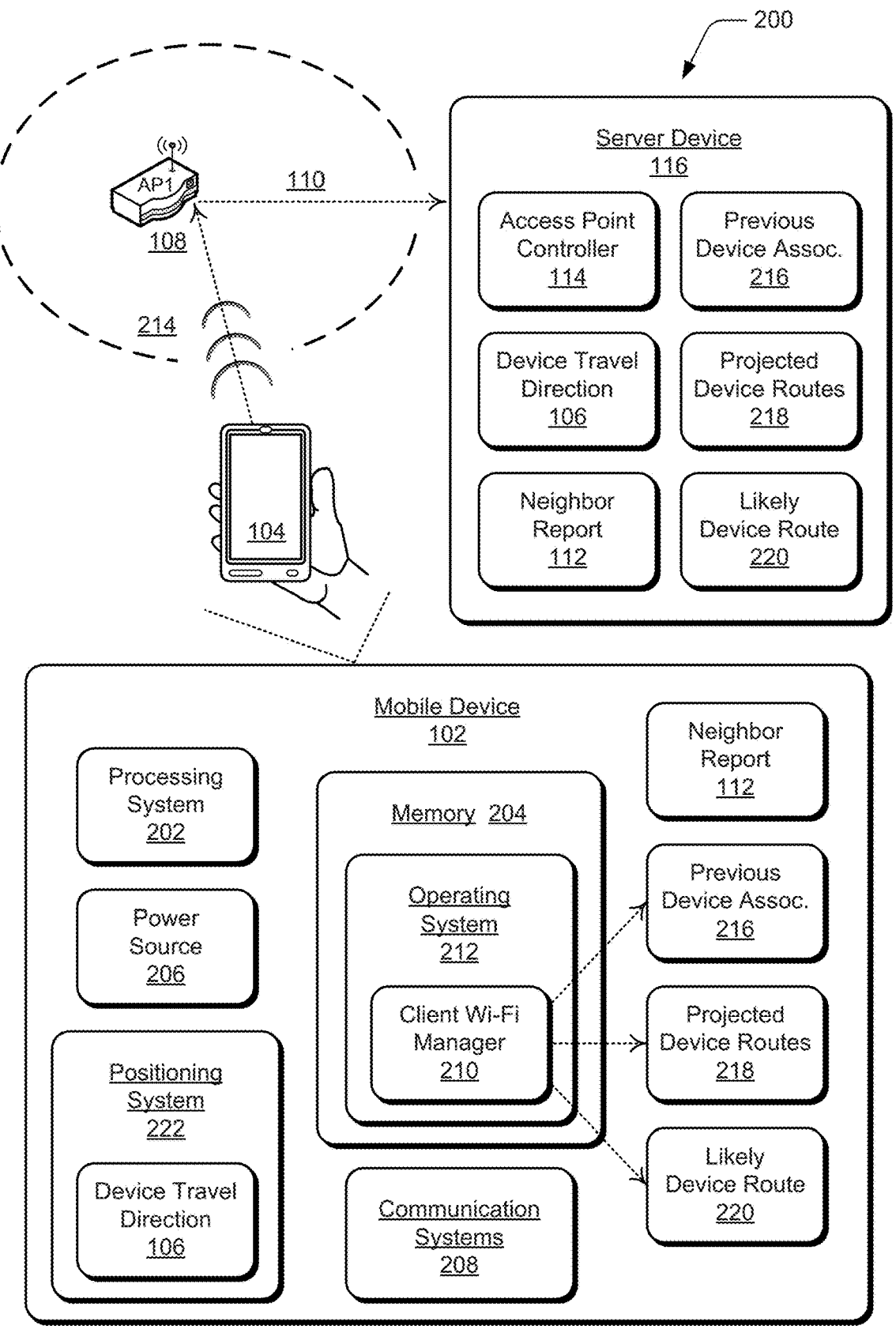
FIG. 2 illustrates an example system in which embodiments of access point assisted roaming can be implemented.

FIG. 2 illustrates an example system 200 in which embodiments of access point assisted roaming can be implemented. The system 200 includes an example of the mobile device 102, such as the mobile phone 104, or any other tablet, computing, gaming, media playback, entertainment, and/or electronic media device that is implemented for wireless communication. The mobile device 102 can be implemented with various components, such as a processing system 202 and memory 204, a power source 206 (e.g., a battery) to power device components, and with any number and combination of different components as further described with reference to the example device shown in FIG. 5.

The mobile device 102, also referred to as a station or a roaming station, is a wireless communication-enabled device that includes one or more communication systems 208 implemented to support several radio access technologies, such as Bluetooth™ and WiFi, as well as 3G, 4G, and/or LTE cellular communication technologies. For example, the communication systems 208 can be implemented as multiple, different wireless radio systems, such as a Wi-Fi radio system that includes a radio device, antenna, and chipset implemented for Wi-Fi wireless communications technology. Generally, when activated or turned-on, a wireless radio system scans for an endpoint connection to establish a wireless communication link. For example, the mobile phone 104 includes a Wi-Fi radio system that scans for Wi-Fi access points that are within communication range and communicatively-links to the access point (AP1) 108 for wireless communication via Wi-Fi.

The mobile device 102 includes a client Wi-Fi manager 210 that can be implemented as a software application or module, such as executable software instructions (e.g., computer-executable instructions) that are executable with the processing system 202 of the mobile device to implement embodiments of access point assisted roaming. The client Wi-Fi manager 210 can be stored on computer-readable storage memory (e.g., the memory 204), such as any suitable memory device or electronic data storage implemented by the mobile device. In implementations, the client Wi-Fi manager 210 is a component of the device operating system 212, or can be implemented as part of a wireless technology specific service on the mobile device.

In this example, the client Wi-Fi manager 210 of the mobile device 102 initiates the request 110 for the neighbor report 112 for the mobile device 102 (as described with reference to FIG. 1). The mobile device 102 may have an established wireless connection 214 with the access point (AP1) 108, in which case the request 110 for the neighbor report 112 is routed via the access point (AP1) to the access point controller 114 that manages the access points in the wireless communication system. The server device 116 (which may also be configured as an access point in the wireless communication system) implements the access point controller 114 that receives the request 110 for the neighbor report 112 from the mobile device 102. Any of the access points, mobile devices, and server devices described herein can be implemented with various components, such as a processing system and memory, and with any number and combination of different components as further described with reference to the example device shown in FIG. 5.

Further, the access point controller 114 at the server device 116 can be implemented as a software application or module, such as executable software instructions (e.g., computer-executable instructions) that are executable by a processing system of the server device to implement embodiments of access point assisted roaming. The access point controller 114 can be stored on computer-readable storage memory, such as any suitable memory device or electronic data storage implemented by the server device.

In embodiments, the access point controller 114 at the access point (AP3) 124 is implemented to obtain the travel direction 106 of the mobile device 102. For example, a user of the mobile device 102 may be walking in the travel direction 106 in the office building, or in any other environment, as described with reference to FIG. 1, and multiple access points are implemented for wireless connection with the mobile devices, such as the mobile device 102 and the mobile phone 104. The travel direction 106 of the mobile device 102 is relative to the multiple access points that are proximate the roaming mobile device and configured for a wireless connection with the mobile device.

The access point controller 114 can maintain a record of previous device associations 216, such as the previous access point associations for the mobile device 102 in the wireless communication system. The access point controller 114 can utilize the previous device associations 216 as a client roaming history to project the possible device routes 218 and determine a likely device route 220 based on the current travel direction 106 of the mobile device 102. The access point controller 114 at the server device 116 is implemented to project the possible device routes 218 of the mobile device 102 for the travel direction 106 of the mobile device, and can also determine a likely device route 220 of the mobile device based on the projected device routes 218 in the travel direction 106.

The access point controller 114 can obtain the travel direction 106 of the mobile device 102 based on the previous device associations 216. Alternately or in addition, the access point controller 114 can determine the travel direction 106 of the mobile device 102 based on differentials of triangulation positioning, as determined from other access points that are within communication range of the mobile device as described with reference to FIG. 1. Alternatively or in addition, the mobile device 102 may determine the device travel direction 106 and/or speed of travel utilizing a positioning system 222 of the mobile device, such as a Global Positioning System (GPS). The client Wi-Fi manager 210 can then communicate the travel direction 106 to the access point controller 114, and the access point controller receives the device travel direction 106 along with the request 110 for the neighbor report 112.

The access point controller 114 at the server device 116 can then generate the neighbor report 112 that lists one or more of the access points in order of connection likelihood and based on the travel direction 106 of the mobile device 102, as described with reference to FIG. 1. The access point controller 114 is implemented to determine and prioritize the access points that are each configured for a wireless connection with a communication system 208 of a mobile device 102. The server device 116 then communicates the neighbor report 112 to the mobile device 102 that requested the neighbor report. Similar to the request 110 for the neighbor report 112, the neighbor report can be communicated back to the mobile device 102 via the access point (AP1) 108, with which the mobile device 102 already has an established wireless connection 214. The client Wi-Fi manager 210 of the mobile device 102, receives the neighbor report 112 and manages the roaming and wireless connections of the mobile device.

In implementations, the client Wi-Fi manager 210 of the mobile device 102 may also maintain the record of the previous device associations 216 for the mobile device 102 associations with the access points in the wireless communication system. For example, the client Wi-Fi manager 210 can learn that the mobile device 102 is likely to connect next to the access point (AP3) 124 when roaming from the access point (AP1) 108. The client Wi-Fi manager 210 can generate the record of the previous device associations 216 on the mobile device 102, and/or receive the record from the access point controller 114 at the server device 116. Similar to the access point controller 114, the client Wi-Fi manager 210 of the mobile device 102 can project the possible device routes 218 of the mobile device for the current travel direction 106 of the device, and can also determine the likely device route 220 based on the projected device routes in the travel direction.

As described with reference to FIG. 1, the access point controller 114 can utilize the previous access point associations 216 and client roaming history patterns to project the possible device routes 218 based on likelihood percentages that the mobile device 102 will travel along any one of the possible projected device routes. Similarly, the client Wi-Fi manager 210 at the mobile device 102 can utilize the previous access point associations 216 and client roaming history patterns to project the possible device routes 218 based on likelihood percentages that the mobile device 102 will travel along any one of the possible projected device routes. The client Wi-Fi manager 210 can then compare the projected and likely device route determinations from the access point controller 114 and from the client Wi-Fi manager 210 to make access point connection decisions when roaming in the wireless communication system.

Example methods 300 and 400 are described with reference to respective FIGS. 3 and 4 in accordance with one or more embodiments of access point assisted roaming. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
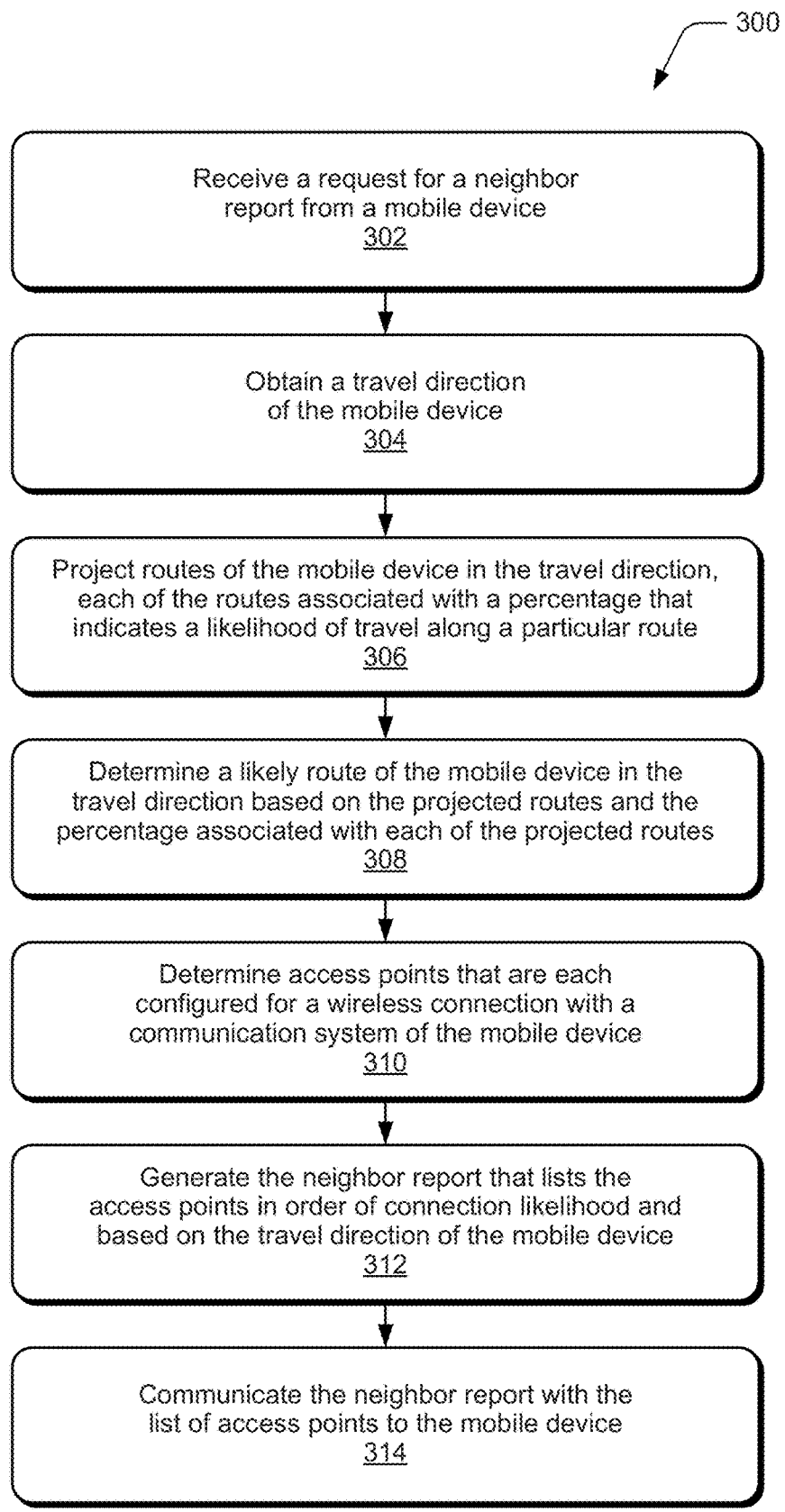
FIG. 3 illustrates example method(s) of access point assisted roaming in accordance with one or more embodiments.

FIG. 3 illustrates example method(s) 300 of access point assisted roaming, and is generally described with reference to the access point controller 114 shown in FIGS. 1 and 2. The order in which the method is described is not intended to be construed as a limitation, and any number or combination of the method operations can be performed in any order to implement a method, or an alternate method.

At 302, a request for a neighbor report is received from a mobile device. For example, the access point controller 114 implemented at the server device 116 receives the request 110 for the neighbor report 112 from the mobile device 102. The access point controller 114 can receive the request 110 for the neighbor report 112 from the mobile device via the access point (AP1) 108 with which the mobile device 102 has an established wireless connection 214.

At 304, a travel direction of the mobile device is obtained. For example, the access point controller 114 at the server device 116 obtains an indication of the device travel direction 106 of the mobile device 102. The access point controller 114 may receive the travel direction 106 of the mobile device 102 as part of the request 110 for the neighbor report 112 (at 302). Alternatively, the access point controller 114 may obtain the travel direction 106 of the mobile device 102 by determining the travel direction based on differentials of triangulation positioning, as determined from the access points that are within communication range of the mobile device 102. Alternatively or in addition, the access point controller 114 may determine the travel direction 106 based on the previous device associations 216 of the mobile device with the access points in the wireless communication system.

At 306, routes of the mobile device are projected in the travel direction, where each of the routes are associated with a percentage that indicates a likelihood of the mobile device traveling along a particular route. For example, the access point controller 114 at the server device 116 projects the different possible routes 218 of the mobile device 102 in the travel direction 106, and each of the routes are associated with a percentage 136 that indicates a likelihood of the mobile device traveling along a particular route. The access point controller 114 may also project the device routes 218 of the mobile device 102 in the travel direction 106 based on a time of the day.

At 308, a likely route of the mobile device in the travel direction is determined based on the projected routes and the percentage associated with each of the projected routes. For example, the access point controller 114 at the server device 116 determines the likely device route 220 of the mobile device 102 in the travel direction 106 based on the projected device routes 218 and the percentage 136 that is associated with each of the projected routes.

At 310, access points that are each configured for a wireless connection with a communication system of the mobile device are determined. For example, the access point controller 114 at the server device 116 determines the access points (e.g., access points (AP3) 124, (AP4) 126, and (AP5) 128 for example) that have a detected signal strength, are in proximity of the mobile device 102, and are configured for a wireless connection 214 with one of the communication systems 208 (e.g., a Wi-Fi radio system) of the mobile device.

At 312, the neighbor report is generated that lists the access points in order of connection likelihood and based on the travel direction of the mobile device. For example, the access point controller 114 at the server device 116 generates the neighbor report 112 that lists the access points (AP3) 124, (AP4) 126, and (AP5) 128 in order of connection likelihood, and the access points are listed based on the device travel direction 106 of the mobile device 102. Additionally, the access point controller 114 generates the neighbor report 112 based on the projected device routes 218 that are projected for the mobile device 102 in the travel direction 106, and may be based on the determination of the likely device route 220 of the mobile device 102.

At 314, the neighbor report with the list of access points is communicated to the mobile device. For example, the access point controller 114 at the server device 116 initiates communication of the neighbor report 112 with the list of access points back to the mobile device 102 that requested the neighbor report, and the server device 116 communicates the neighbor report 112 to the mobile device 102.

Figure 4:
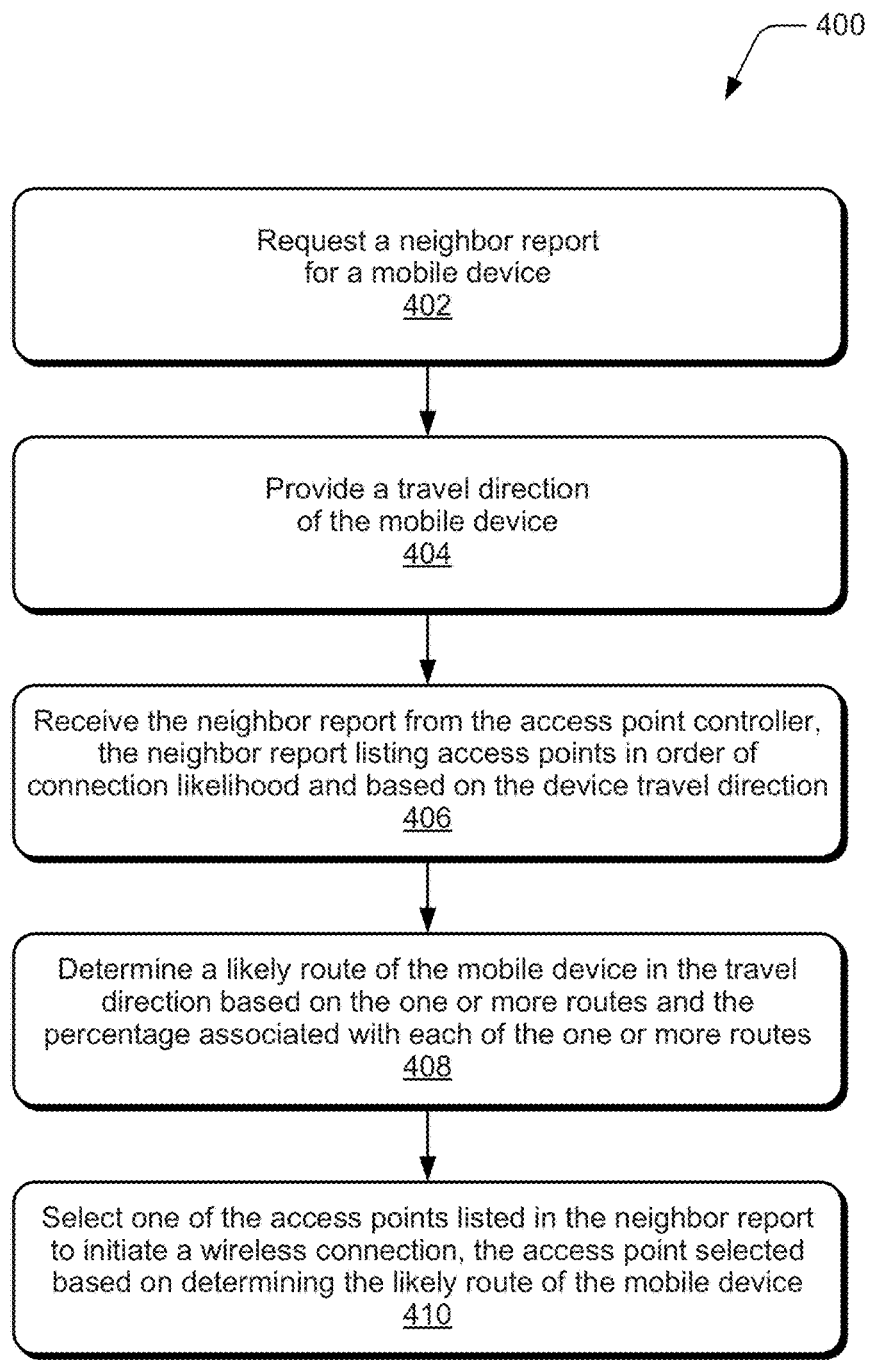
FIG. 4 illustrates example method(s) of access point assisted roaming in accordance with one or more embodiments.

FIG. 4 illustrates example method(s) 400 of access point assisted roaming, and is generally described with reference to the example mobile device 102 shown in FIGS. 1 and 2. The order in which the method is described is not intended to be construed as a limitation, and any number or combination of the method operations can be performed in any order to implement a method, or an alternate method.

At 402, a neighbor report for a mobile device is requested. For example, the client Wi-Fi manager 210 implemented by the mobile device 102 initiates the request 110 for the neighbor report 112 from the access point controller 114 at the server device 116, and the request 110 may be routed to the access point controller 114 via the access point (AP1) 108 that has an established wireless connection 214 with the mobile device 102.

At 404, a travel direction of the mobile device is provided. For example, the mobile device 102 provides the access point controller 114 an indication of the device travel direction 106 of the mobile device 102. The travel direction 106 of the mobile device 102 can be determined by the positioning system 222 of the mobile device, and then provided to the access point controller 114. The travel direction 106 of the mobile device 102 can also include the projected device routes 218 of the mobile device, and each of the projected routes are associated with a percentage 136 that indicates a likelihood of the mobile device 102 traveling along a particular route. Additionally, the different possible device routes 218 of the mobile device 102 can be projected based on the travel direction 106 and based on a time of the day.

At 406, the neighbor report is received from the access point controller, the neighbor report listing access points in order of connection likelihood and based on the travel direction of the mobile device. For example, the mobile device 102 receives the neighbor report 112 from the server device 116 that implements the access point controller 114. The neighbor report 112 lists the access points (AP3) 124, (AP4) 126, and (AP5) 128 in order of connection likelihood and the access points are listed based on the device travel direction 106 of the mobile device 102, based on the percentages 136 of the projected device routes 218, and/or based on the time of the day.

At 408, a likely route of the mobile device in the travel direction is determined based on the one or more routes and the percentage associated with each of the one or more routes. For example, the client Wi-Fi manager 210 determines the likely device route 220 of the mobile device 102 in the travel direction 106 based on the projected device routes 218 and the percentage 136 associated with each of the routes.

At 410, one of the access points listed in the neighbor report is selected to initiate a wireless connection, the access point selected based on determining the likely route of the mobile device. For example, the client Wi-Fi manager 210 selects one of the access points (AP5) 128 listed in the neighbor report 112 to initiate a wireless connection, where the access point (AP5) 128 is selected for the wireless connection based on determining the likely device route 220 of the mobile device 102.

Figure 5:
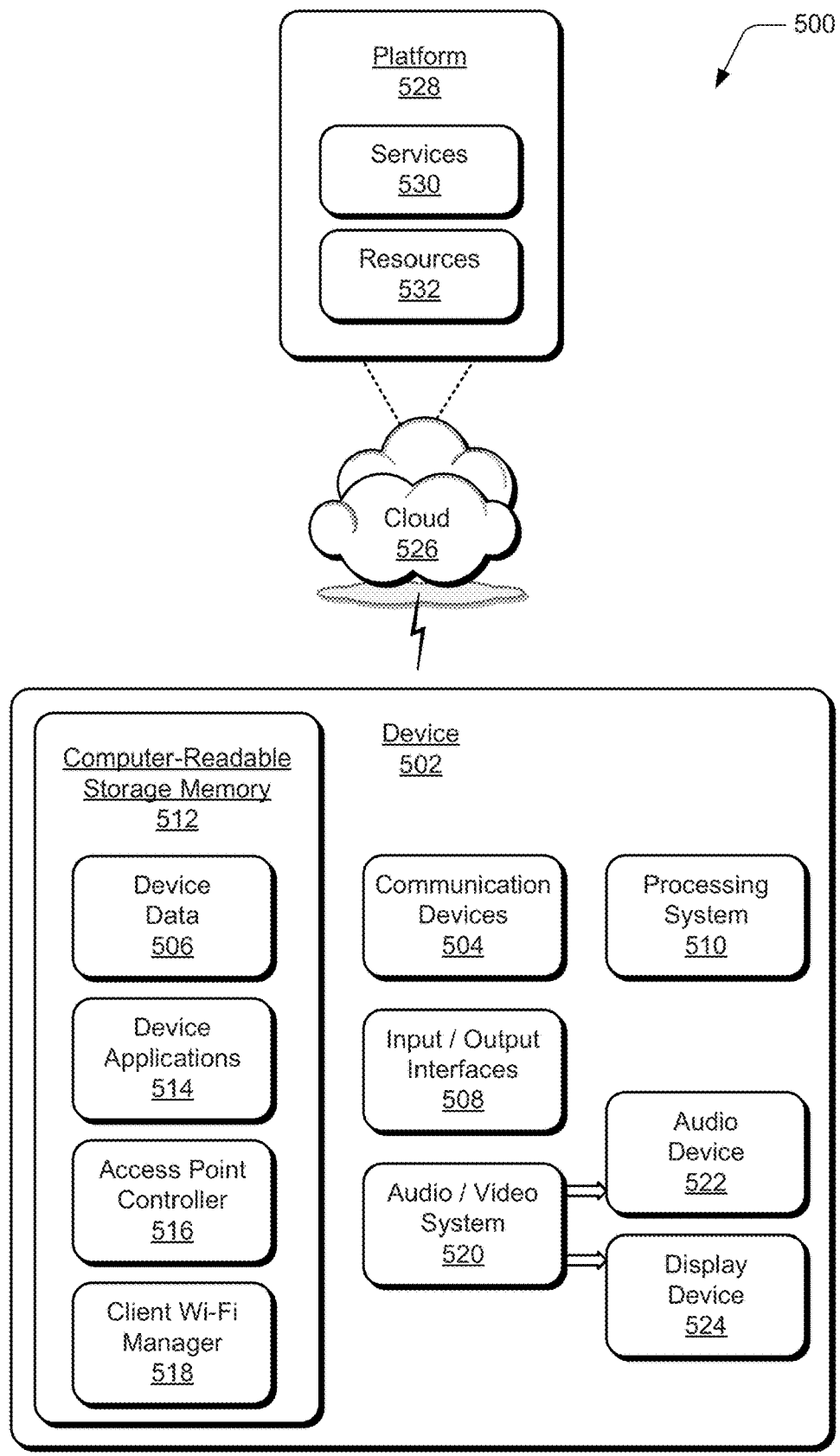
FIG. 5 illustrates an example system with an example device that can implement embodiments of access point assisted roaming.

FIG. 5 illustrates an example system 500 that includes an example device 502, which can implement embodiments of access point assisted roaming. The example device 502 can be implemented as any of the computing devices described with reference to the previous FIGS. 1-4, such as any type of mobile device, client device, mobile phone, tablet, computing, communication, entertainment, gaming, media playback, and/or other type of device. For example, the mobile device 102 and/or the mobile phone 104 shown in FIGS. 1 and 2 may be implemented as the example device 502.

The device 502 includes communication devices 504 that enable wired and/or wireless communication of device data 506, such as a neighbor report, a record of previous device associations with access points, an indication of device travel direction, likely and projected device routes of a mobile device, and/or any other wireless radio systems data. Additionally, the device data can include any type of audio, video, and/or image data. The communication devices 504 can also include transceivers for cellular phone communication and for network data communication.

The device 502 also includes input/output (I/O) interfaces 508, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes a computer-readable storage memory 512, such as data storage devices that can be accessed by computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations.

The computer-readable storage memory 512 provides storage of the device data 506 and various device applications 514, such as an operating system that is maintained as a software application with the computer-readable storage memory and executed by the processing system 510. In this example, the device applications include an access point controller 516 and a client Wi-Fi manager 518 that implement embodiments of access point assisted roaming, such as when the example device 502 is implemented as the mobile device 102 or the mobile phone 104 shown in FIG. 1. An example of the access point controller 516 is the access point controller 114 that is implemented by the server device 116, and an example of the client Wi-Fi manager 518 is the client Wi-Fi manager 210 that is implemented by the mobile device 102, as described with reference to FIGS. 1-4.

The device 502 also includes an audio and/or video system 520 that generates audio data for an audio device 522 and/or generates display data for a display device 524. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device.

In embodiments, at least part of the techniques described for access point assisted roaming may be implemented in a distributed system, such as over a "cloud" 526 in a platform 528. The cloud 526 includes and/or is representative of the platform 528 for services 530 and/or resources 532. The platform 528 abstracts underlying functionality of hardware, such as server devices (e.g. included in the services 530) and/or software resources (e.g., included as the resources 532), and connects the example device 502 with other devices, servers, etc. The resources 532 may also include applications and/or data that can be utilized while computer processing is executed on servers that are remote from the example device 502. Additionally, the services 530 and/or the resources 532 may facilitate subscriber network services, such as over the Internet, a cellular network, or Wi-Fi network. The platform 528 may also serve to abstract and scale resources to service a demand for the resources 532 that are implemented via the platform, such as in an interconnected device embodiment with functionality distributed throughout the system 500. For example, the functionality may be implemented in part at the example device 502 as well as via the platform 528 that abstracts the functionality of the cloud 526.

Although embodiments of access point assisted roaming have been described in language specific to features and/or methods, the appended claims are not necessarily limited to the specific features or methods described. Rather, the specific features and methods are disclosed as example implementations of access point assisted roaming, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

A method implemented by an access point controller comprises receiving a request for a neighbor report from a mobile device; obtaining a travel direction of the mobile device; determining access points, each configured for a wireless connection with a communication system of the mobile device, the wireless connection based at least in part on a detected signal strength of an access point; and generating the neighbor report that lists one or more of the access points in order of connection likelihood and based on the travel direction of the mobile device.

Alternatively or in addition to the above described method, any one or combination of: projecting one or more routes of the mobile device in the travel direction, each of the one or more routes associated with a percentage that indicates a likelihood of the mobile device traveling along a particular route; generating the neighbor report based on the travel direction of the mobile device and based on the one or more routes projected for the mobile device in the travel direction; determining a likely route of the mobile device in the travel direction based on the one or more routes and the percentage associated with each of the one or more routes; projecting the one or more routes of the mobile device in the travel direction based on a time of the day; receiving the request for the neighbor report includes the travel direction as determined by a positioning system of the mobile device; obtaining the travel direction of the mobile device includes determining the travel direction based on differentials of triangulation positioning, as determined from the access points that are within communication range of the mobile device; and obtaining the travel direction of the mobile device includes determining the travel direction based on previous associations of the mobile device with the one or more access points.

An access point comprises a communication system configured for wireless communications; a memory configured to maintain a neighbor report that lists access points, each configured for wireless connection with a communication system of a mobile device; a processing system to implement a access point controller that is executable and configured to: receive a request for the neighbor report from the mobile device; obtain a travel direction of the mobile device; determine the access points that are each configured for the wireless connection based at least in part on a detected signal strength of an access point; and generate the neighbor report that lists one or more of the access points in order of connection likelihood and based on the travel direction of the mobile device.

Alternatively or in addition to the above described access point, any one or combination of: the access point controller is configured to project one or more routes of the mobile device in the travel direction, each of the one or more routes associated with a percentage that indicates a likelihood of the mobile device traveling along a particular route; the access point controller is configured to said generate the neighbor report based on the travel direction of the mobile device and based on the one or more routes projected for the mobile device in the travel direction; the access point controller is configured to determine a likely route of the mobile device in the travel direction based on the one or more routes and the percentage associated with each of the one or more routes; the access point controller is configured to said project the one or more routes of the mobile device in the travel direction based on a time of the day; the access point controller is configured to said receive the request for the neighbor report, the request including the travel direction as determined by a positioning system of the mobile device; the access point controller is configured to said obtain the travel direction of the mobile device by determining the travel direction based on differentials of triangulation positioning, as determined from the access points that are within communication range of the mobile device; and the access point controller is configured to said obtain the travel direction of the mobile device by determining the travel direction based on previous associations of the mobile device with the one or more access points.

A method implemented by a mobile device comprises requesting a neighbor report for a mobile device, the request routed to an access point controller via an access point that has an established wireless connection with the mobile device; providing a travel direction of the mobile device; and receiving the neighbor report from the access point controller, the neighbor report listing one or more access points, each configured for a wireless connection with a communication system of the mobile device, the access points listed in order of connection likelihood and based on the travel direction of the mobile device.

Alternatively or in addition to the above described method, any one or combination of: the neighbor report lists the access points in the order of connection likelihood based on the travel direction of the mobile device and based on one or more routes projected for the mobile device in the travel direction; the travel direction of the mobile device includes one or more projected routes of the mobile device in the travel direction, each of the one or more routes associated with a percentage that indicates a likelihood of the mobile device traveling along a particular route; determining a likely route of the mobile device in the travel direction based on the one or more routes and the percentage associated with each of the one or more routes, and selecting one of the access points listed in the neighbor report to initiate a wireless connection, the access point selected for the wireless connection based on said determining the likely route of the mobile device.

The invention claimed is:

1. A method, comprising:
receiving, from a mobile device, a request for a neighbor report in association with a particular time of day;
obtaining travel information that includes a travel direction of the mobile device;
obtaining roaming pattern information that defines a plurality of client roaming history patterns for the mobile device in association with a plurality of different times of day;
responsive to the request for the neighbor report, analyzing the roaming pattern information based on the particular time of day to project one or more routes of the mobile device that are associated with the travel direction and the particular time of day;
determining one or more access points that are located along the one or more routes that are associated with the travel direction and the particular time of day, individual access points configured to facilitate a wireless connection with a communication system of the mobile device based at least in part on detected signal strengths in association with the individual access points; and
generating the neighbor report that lists one or more of the individual access points in order of a connection likelihood that is determined based on the particular time of day and the travel information for the mobile device.

2. The method as recited in claim 1, wherein individual routes of the one or more routes are associated with individual percentages that indicate a likelihood of the mobile device traveling along ones of the individual routes.

3. The method as recited in claim 2, wherein the generating the neighbor report includes generating the neighbor report based on:
the travel direction of the mobile device,
the one or more routes projected for the mobile device in the travel direction, and
the particular time of day.

4. The method as recited in claim 2, further comprising:
determining a likely route of the mobile device in the travel direction based on the particular time of day, wherein at least one other route of the mobile device in the travel direction is determined to be an unlikely route based on the particular time of day.

5. The method as recited in claim 1, wherein the generating the neighbor report comprises prioritizing the one or more access points in a likely route of the mobile device in the travel direction based the particular time of day.

6. The method as recited in claim 1, wherein the obtaining the travel information includes determining the travel direction based on differentials of triangulation positioning, as determined from the one or more access points that are within communication range of the mobile device.

7. The method as recited in claim 1, wherein the plurality of client roaming history patterns include at least:
a first client roaming history pattern that is associated with a first time of day, and
a second client roaming history pattern that is associated with a second time of day.

8. An access point, comprising:
a communication system configured for wireless communications;
at least one processor;
a memory in communication with the at least one processor, the memory having computer-readable instructions stored thereupon that, when executed by the processor, cause the access point to:
receive, from a mobile device, a request for a neighbor report in association with a particular time of day;
obtain travel information that includes a travel direction of the mobile device;
obtain roaming pattern information that defines, for the mobile device, a plurality of client roaming history patterns that correspond to a plurality of different times of day, wherein the plurality of client roaming history patterns are indicative of at least:
   a first client roaming route that corresponds to the travel direction, and
   a second client roaming route that corresponds to the travel direction;
determine, based on the request being associated with the particular time of day, that a first probability that the mobile device will travel along the first client roaming route is greater than a second probability that the mobile device will travel along the second client roaming route;
determine one or more first access points along the first client roaming route and one or more second access points along the second client roaming route; and
generate the neighbor report to list the first access points and the second access points in an order of connection likelihood that is based at least in part on the first probability that the mobile device will travel along the first client roaming route being greater than a second probability that the mobile device will travel along the second client roaming route.

9. The access point as recited in claim 8, wherein the neighbor report is generated based on one or more routes projected for the mobile device in the travel direction at the particular time of day.

10. The access point as recited in claim 8, wherein the neighbor report lists individual ones of the first access points and the second access points in accordance with the direction of travel.

11. The access point as recited in claim 8, wherein the travel direction is determined based on differentials of triangulation positioning, as determined from one or more access points that are within communication range of the mobile device.

12. The access point as recited in claim 8, wherein the travel direction is determined based on the previous device associations of the mobile device with the one or more access points.

13. The access point as recited in claim 8, wherein the first client roaming route that corresponds to the travel direction is associated with a first time of day, and wherein the second client roaming route that corresponds to the travel direction is associated with a second time of day.

14. The access point as recited in claim 8, wherein the roaming pattern information indicates that at the particular time of day the mobile device is more likely to travel along the first client roaming route than the second client roaming route.

15. The access point as recited in claim 14, wherein the roaming pattern information indicates that at another time of day, that is different than the particular time of day, the mobile device is more likely to travel along the second client roaming route than the first client roaming route.

16. The access point as recited in claim 8, wherein the computer-readable instructions stored thereupon that, when executed by the processor, further cause the access point to:
   determine, based on another request being associated with another time of day that is different than the particular time of day, that a third probability that the mobile device will travel along the first client roaming route is less than a fourth probability that the mobile device will travel along the second client roaming route.

17. A system, comprising:
at least one processor;
a memory in communication with the at least one processor, the memory having computer-readable instructions stored thereupon that, when executed by the at least one processor, cause the system to:
   receive, from a mobile device, a request for a neighbor report in association with a particular time of day;
   obtain travel information that includes a travel direction of the mobile device;
   obtain roaming pattern information that defines a plurality of client roaming history patterns for the mobile device in association with a plurality of different times of day;
   responsive to the request for the neighbor report, analyze the roaming pattern information based on the particular time of day to project one or more routes of the mobile device that are associated with the travel direction and the particular time of day;
   determine one or more access points that are located along the one or more routes that are associated with the travel direction and the particular time of day, individual access points configured to facilitate a wireless connection with a communication system of the mobile device based at least in part on detected signal strengths associated with the individual access points; and
   generate the neighbor report that lists one or more of the individual access points in order of a connection likelihood that is determined based on the particular time of day and the travel information for the mobile device.

18. The system as recited in claim 17, wherein individual routes of the one or more routes are associated with individual percentages that indicate a likelihood of the mobile device traveling along ones of the individual routes.

19. The system as recited in claim 17, wherein the computer-readable instructions, when executed by the at least one processor, further cause the system to:
   determine a likely route of the mobile device in the travel direction based on the particular time of day, wherein at least one other route of the mobile device in the travel direction is determined to be an unlikely route based on the particular time of day.

20. The system as recited in claim 17, wherein generating the neighbor report comprises prioritizing the one or more access points in a likely route of the mobile device in the travel direction based the particular time of day.

\* \* \* \* \*